(12) United States Patent
Harding

(10) Patent No.: US 6,942,069 B1
(45) Date of Patent: Sep. 13, 2005

(54) BRAKING SYSTEM FOR A WHEELED ABRADING MACHINE

(75) Inventor: William R. Harding, Middletown, MD (US)

(73) Assignee: Equipment Development Company, Inc., Frederick, MD (US)

(*) Notice: Subject to any disclaimer, the term of this patent is extended or adjusted under 35 U.S.C. 154(b) by 0 days.

(21) Appl. No.: 10/802,932

(22) Filed: Mar. 18, 2004

(51) Int. Cl.[7] .............................................. F16D 55/36
(52) U.S. Cl. ................. 188/4 B; 188/71.5; 188/206 R; 451/288
(58) Field of Search ..................... 188/16, 4 B, 71.5, 188/72.8, 73.1, 196 V, 206 R; 451/287, 288, 451/290

(56) References Cited

U.S. PATENT DOCUMENTS

| | | | | |
|---|---|---|---|---|
| 1,860,236 A | * | 5/1932 | Davis ............................. 38/40 |
| 2,616,226 A | * | 11/1952 | D Avaucourt .............. 451/289 |
| 2,704,424 A | * | 3/1955 | D Avaucourt .............. 451/289 |
| 3,142,942 A | * | 8/1964 | Celovsky ................... 451/292 |
| 3,590,537 A | * | 7/1971 | Hennig et al. ............. 451/254 |
| 4,292,765 A | * | 10/1981 | Brawley ....................... 451/49 |
| 5,152,104 A | * | 10/1992 | Wood et al. ................ 451/269 |
| 5,954,566 A | * | 9/1999 | Bauer .......................... 451/41 |

* cited by examiner

Primary Examiner—Robert A. Siconolfi
Assistant Examiner—Melody M. Burch
(74) Attorney, Agent, or Firm—Michael W. York

(57) ABSTRACT

An abrading machine braking system for use in braking a wheeled abrading machine having a rotating abrading tool used in abrading a surface. The abrading machine braking system uses two braking wheels that engage the surface of the wheels of the abrading machine and the braking wheels are fixed to the respective ends of a brake axle that is in turn coupled to a brake cylinder assembly. The brake cylinder assembly contains a plurality of steel discs that are keyed to a lengthwise slot in the brake axle so that the discs rotate with the axial. A plastic braking disc is located adjacent to one of the steel discs within the brake cylinder assembly and provides a braking force that is transmitted to the two brake wheels through the brake axle. A brake release handle is used to bring the braking wheels into contact with the wheels on the abrading machine and to remove them from contact with the abrading machine wheels.

15 Claims, 3 Drawing Sheets

BRAKING SYSTEM FOR A WHEELED ABRADING MACHINE

BACKGROUND OF THE INVENTION

Wheel mounted abrading apparatus are in widespread use for flat or substantially flat surfaces such as various concrete and asphalt including floors, pavement and the like. Typically such abrading apparatus will use a rotating drum that has an outer surface containing various types of cutting or abrading elements. The abrading apparatus is mounted on wheels to make it mobile and so that it can be readily moved over the surface that is to be abraded. Unfortunately, when the rotating abrading tool or the like engages the surface that is to be abraded large frictional forces are created that provide a propulsion force to the wheel mounted abrading apparatus that tends to move the abrading apparatus away from the intended area that is to be abraded. This propulsion force can vary considerably depending upon the type of surface being abraded, the condition of the surface and the depth that the surface is to be abraded.

These propulsion forces can have undesirable consequences. As a result of these forces the surface can fail to be abraded as desired. The abrading apparatus may not have its cutting or abrading elements in contact with the surface being worked on for a sufficient time due to the propulsion forces to enable sufficient abrading of the surface or the surface can be abraded in a nonuniform manner. The operator of the wheel mounted abrading apparatus can manually grip the handles of the abrading apparatus to attempt to overcome the friction generated propulsion forces, but this may not be entirely satisfactory in achieving a satisfactory abraded surface. At the very least, such manual restraining action by the operator of the abrading apparatus can be very tiring.

Consequently, a braking system is needed that can counteract the undesired friction generated propulsion forces when they occur. Since friction generated propulsion forces can vary greatly due to different abrading tool surfaces and due to the material that is being abraded, it is highly desirable that any braking system be adjustable so that it can provide a range of braking forces. It is also highly desirable that the braking system be easily activated and deactivated by the operator of the wheel mounted abrading apparatus without interfering with the normal operation of the wheel mounted abrading apparatus.

The braking system for a wheel mounted abrading machine of this invention provides these benefits. This braking system invention provides a braking force that counteracts the friction generated propulsion forces and the braking system is readily adjustable to provide a wide range of braking forces. Moreover, the braking system is readily engaged and disengaged by the operator through the use of one hand while maintaining manual control of the wheel mounted abrading apparatus. This braking system invention also has provisions for the operator of the wheel mounted abrading apparatus through proper adjustments to apply a wide range of braking forces. This braking system invention has the added advantage that it can be used to retrofit existing wheel mounted abrading apparatus as well as being built into new wheel mounted abrading apparatus. This is possible since the abrading machine braking system invention applies its braking forces to the outer surfaces of the wheels or tires of the wheeled abrading machine or apparatus.

SUMMARY OF THE INVENTION

This invention relates to apparatus for controlling the speed or movement of wheeled surface abrading machines and more particularly to a braking system associated with the wheels of the surface abrading machine.

It is a primary object of the invention to provide a braking system for a wheeled surface abrading machine that effectively controls the speed of the wheeled surface abrading machine along the surface that is being abraded.

It is also an object of the invention to provide a braking system for a wheeled surface abrading machine that is easily used by the operator of the wheeled surface abrading machine.

It is an object of the invention to provide a braking system for a wheeled surface abrading machine that exerts an effective braking force on the wheels of the surface abrading machine.

It is an object of the invention to provide a braking system for a wheeled surface abrading machine that is adjustable to provide various braking forces.

It is an object of the invention to provide a braking system for a wheeled surface abrading machine that is readily adjustable by the operator of the wheeled surface abrading machine.

It is an object of the invention to provide a braking system for a wheeled surface abrading machine that is easy to activate.

It is an object of the invention to provide a braking system for a wheeled surface abrading machine that is easy to disengage.

It is an object of the invention to provide a braking system for a wheeled surface abrading machine that applies a braking force to the outer periphery of the wheels of the abrading machine.

It is an object of the invention to provide a braking system for a wheeled surface abrading machine that is very effective.

It is an object of the invention to provide a braking system for a wheeled surface abrading machine that is very reliable.

It is an object of the invention to provide a braking system for a wheeled surface abrading machine that is easy to maintain.

It is an object of the invention to provide a braking system for a wheeled surface abrading machine that requires very little maintenance.

It is an object of the invention to provide a braking system for a wheeled surface abrading machine that has few moving parts.

It is an object of the invention to provide a braking system for a wheeled surface abrading machine that is easy to repair.

It is an object of the invention to provide a braking system for a wheeled surface abrading machine that uses easily replaceable parts that are subject to wear.

It is an object of the invention to provide a braking system for a wheeled surface abrading machine that is uses inexpensive replaceable parts that are subject to wear.

It is an object of the invention to provide a braking system for a wheeled surface abrading machine that can be used to retrofit existing wheeled surface abrading machines.

These and other objects of the invention will be apparent from the following description of the abrading machine braking system for use in braking a wheeled abrading machine having a rotating cutter or other abrading element used in abrading a surface that includes two braking wheels that engage the surface of the wheels of the abrading machine with the braking wheels being fixed to the respective ends of a brake axle that is in turn coupled to a brake cylinder assembly. The brake cylinder assembly contains steel discs that are keyed to a lengthwise slot in the brake axle so that the discs rotate with the axle. A plastic braking disc is located adjacent to one of the steel discs within the brake cylinder assembly and provides a braking force that is transmitted to the two brake wheels through the brake axle. The abrading machine braking system includes a control rod that is used by the operator to manually bring the braking wheels into contact with the wheels on the abrading machine and to remove them from contact with the abrading machine wheels.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
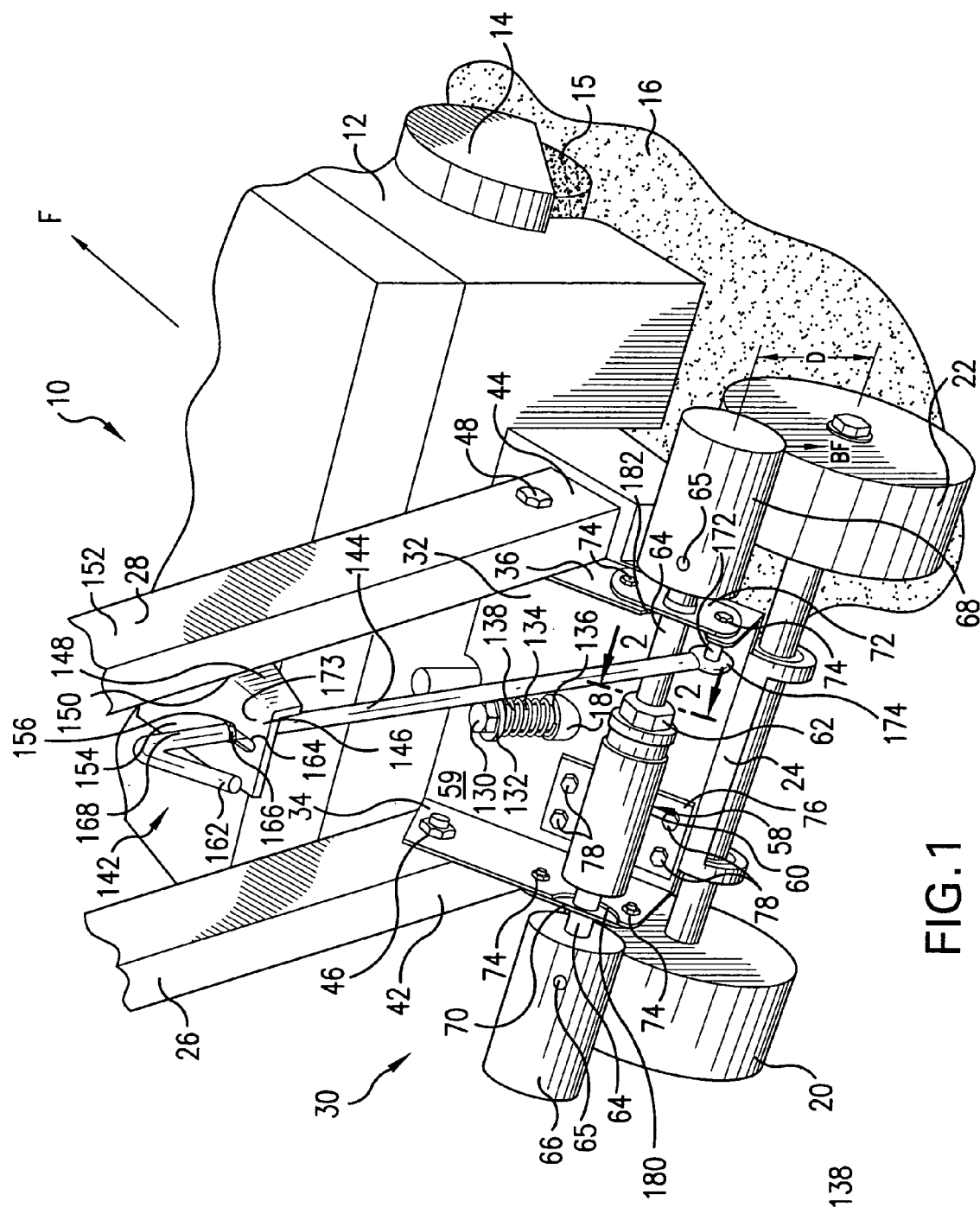
FIG. 1 is a perspective view of a portion of a wheeled surface abrading machine with the braking system invention with portions broken away.

Referring first to FIG. 1, a portion of a conventional wheeled surface abrading machine is illustrated and is designated generally by the number 10. The abrading machine 10 has a main housing 12 that contains rotatable abrading apparatus 14 that has a conventional rotating abrading element 15 that is abrading the surface 16. This abrading action of the rotating abrading element 15 results in a forward force indicated by the arrow F being exerted on the abrading machine 10 that tends to propel the wheeled surface abrading machine 10 forward in the direction of the arrow F in an undesired manner. A generally rectangular wheel mount 18 extends rearward from the main housing 12 and two identical wheels 20 and 22 are rotatably mounted in a conventional manner on each side of the rear portion 24 of the wheel mount 18. Two spaced apart control arms 26 and 28 are connected to the main housing 12 on each side of the wheel mount 18. The wheeled surface abrading machine 10 and its various components that have been mentioned are conventional.

The braking system invention for a wheeled surface abrading machine is illustrated in FIG. 1 and is designated generally by the number 30. The braking system 30 comprises a generally rectangular shaped brake mounting plate 32 that has two upward extending end portions 34 and 36. The inner portions of the upward extending end portions 34 and 36 are pivotally connected to the lower portions 42 and 44 of the respective control arms 26 and 28 by the respective conventional bolts 46 and 48 that extend through holes in the lower portions 42 and 44 of the control arms 26 and 28. The bolts 46 and 48 are secured in place by conventional lock nuts or the like.

The braking system 30 also includes a brake assembly designated generally by the number 58 that is mounted on the upper surface 59 of the brake mounting plate 32. The brake assembly 58 includes a brake cylinder assembly 60, a brake adjusting mechanism 62, a brake cylinder shaft 64, and two cylindrical brake wheels 66 and 68 are non-rotatably mounted on the ends of the brake cylinder shaft 64 by the roll pins 65 or the like. The brake assembly 58 also includes two identical conventional shaft bearing assemblies 70 and 72 that are located on the respective upward extending portions 34 and 36 of the mounting plate 32 for rotatably mounting the brake cylinder shaft 64. The bearing assemblies 70 and 72 are connected to the end portions 34 and 36 through conventional fasteners such as bolts 74 or the like. The brake cylinder assembly 60 is secured to a brake cylinder mounting plate 76 by welding or the like and the brake cylinder mounting plate 76 is in turn connected to the brake mounting plate 32 by the four conventional threaded mounting bolts 78.

Figure 2:
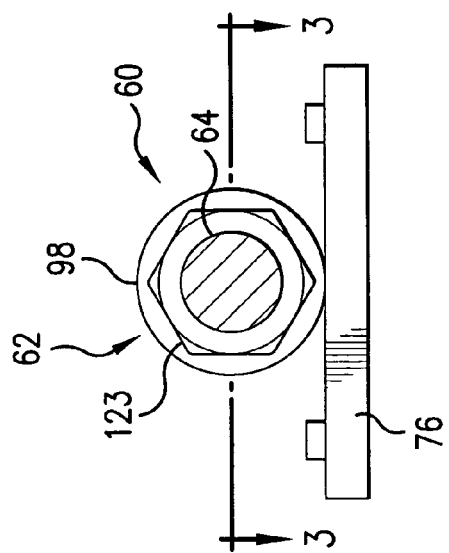
FIG. 2 is an enlarged end view of a portion of the braking system illustrated in FIG. 1 taken substantially in the direction of the line 2—2 with portions thereof broken away.
Figure 3:
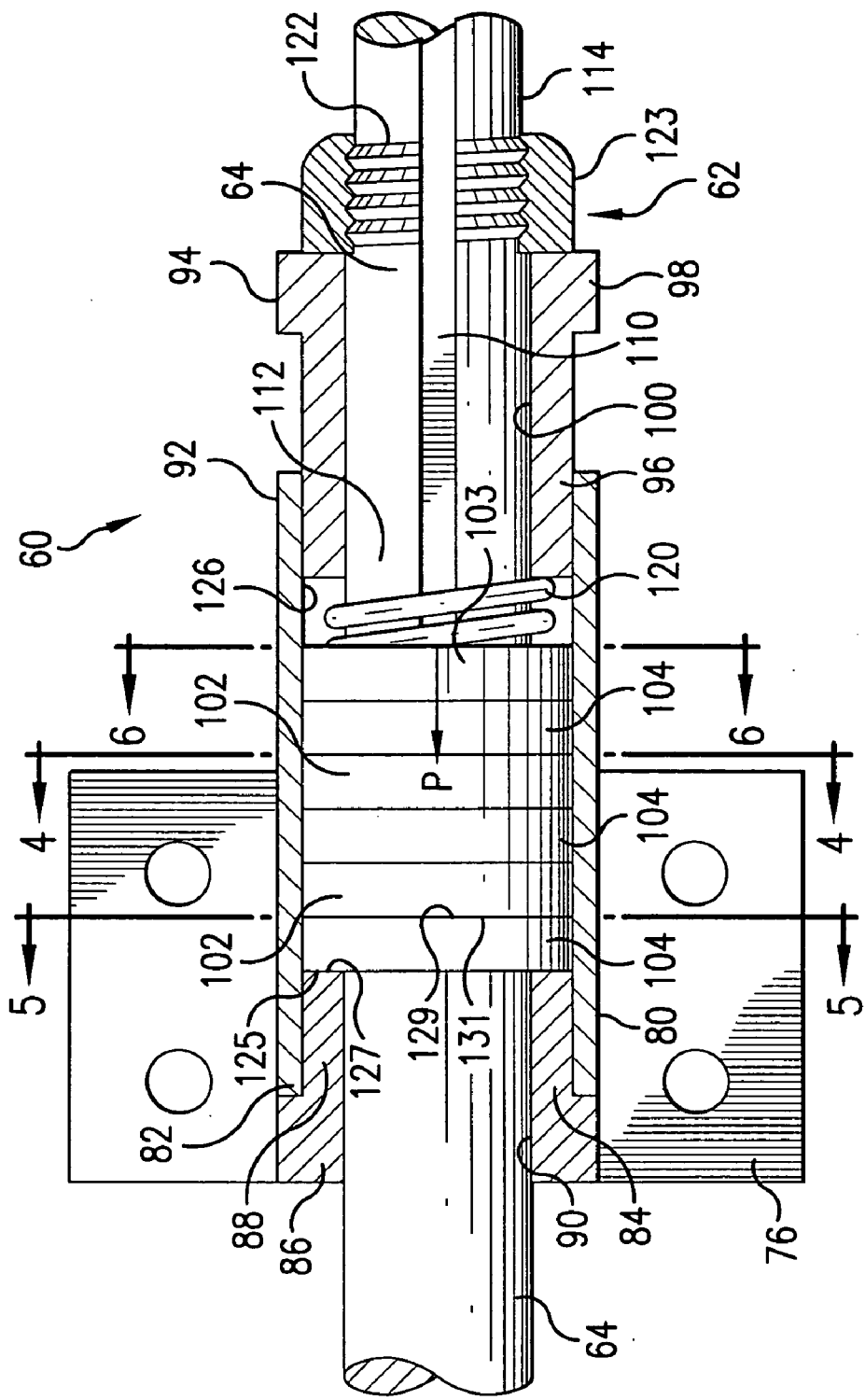
FIG. 3 is a sectional view of the structure illustrated in FIG. 2 taken substantially in the direction of the line 3—3 thereof with certain components not shown in section.

The details of the brake cylinder assembly 60, the brake adjusting mechanism 62, and the brake cylinder shaft 64 are best illustrated in FIGS. 2 through 6. As best illustrated in FIGS. 2 and 3, the brake cylinder assembly 60 comprises a hollow cylindrical brake cylinder tube 80 that is closed at one end portion 82 by a brake cylinder end cap 84 that has an enlarged cylindrical portion 86 that is located outside of the end portion 82 of the brake cylinder tube 80 and a smaller cylindrical portion 88 that fits within the end portion 82 of the brake cylinder tube 80. The brake cylinder end cap 84 has a circular cross section hole 90 extending through it that is sized and shaped to rotatably receive a portion of the brake cylinder shaft 64. In the preferred embodiment, the brake cylinder end cap 84, the brake cylinder tube 80, and the brake cylinder mounting plate 76 are welded together prior to the assembly of the braking system invention 30. The other end portion 92 of the brake cylinder tube 80 is closed by another brake cylinder end cap 94 that has a circular cross section cylindrical portion 96 that is sized and shaped to freely slide within the end portion 92 of the brake cylinder tube 80. This brake cylinder end cap 94 has an enlarged cylindrical portion 98 at its outer end. The end cap 94 has a centrally located circular cross section hole 100 extending through it that is sized and shaped to receive a portion of the brake cylinder shaft 64.

Figure 4:
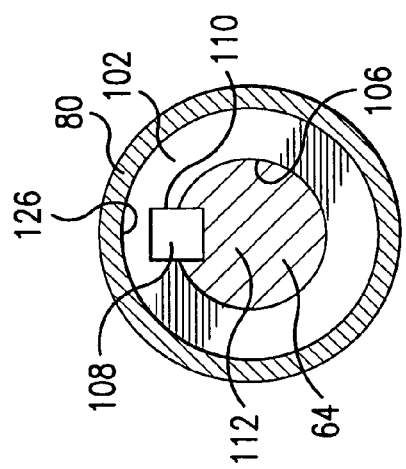
FIG. 4 is a sectional view of the structure illustrated in FIG. 3 taken in the direction of the line 4—4 thereof.

As best illustrated in FIGS. 3 through 6, alternating steel discs 102 and plastic nylon discs 104 are located inside the brake cylinder tube 80 between the brake cylinder end caps 84 and 94 and a steel disc 103 is also located between the the brake cylinder end caps 84 and 94 near the end cap 94. As illustrated in FIG. 4, the steel discs 102 are circular shaped and have a centrally located hole 106 that is sized and shaped to accept the adjacent portion 112 of the brake cylinder shaft 64. The steel disc 102 also has a generally rectangular shaped projection 108 that extends into the circular shaped hole 106. This projection 108 is sized and shaped to fit into an elongated channel or key seat 110 that runs lengthwise in the brake cylinder shaft 64 for the portion 112 of the cylinder shaft 64 that is to fit inside the brake cylinder tube 80 plus the portion 114 that extends to one end of the brake cylinder shaft 64. In view of the projection 108 and the corresponding adjacent channel 110, the steel disc 102 rotates with the brake cylinder shaft 64 within the brake cylinder tube 80.

Figure 6:
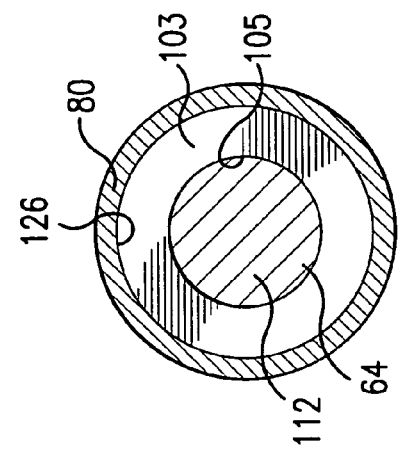
FIG. 6 is a sectional view of the structure illustrated in FIG. 3 taken in the direction of the line 6—6 thereof.

As illustrated in FIG. 6, the steel disc 103 is identical to the steel disc 102 illustrated in FIG. 4 except that the projection 108 is omitted with the disc 103. Since the disc 103 is identical to the disc 102 except for the omitted projection 108, the hole 105 in the disc 103 is also the same size as the hole 106 in the disc 102. Since the projection 108 is omitted, the steel disc 103 is not forced to rotate as the brake cylinder shaft 64 rotates as is the case with the other steel discs 102 that have the projection 108.

Figure 5:
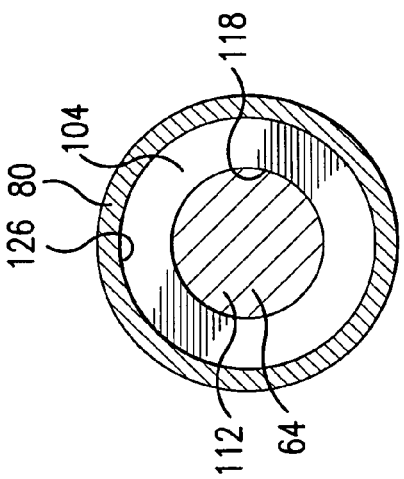
FIG. 5 is a sectional view of the structure illustrated in FIG. 3 taken in the direction of the line 5—5 thereof.

As illustrated in FIG. 5, the plastic disc 104 also has a centrally located circular shaped hole 118 that is sized and shaped to accept a portion of the brake cylinder shaft 64. However, there is no projection extending into this hole 118 as there is with the steel disc 102 and the projection 108. Consequently, the plastic disc 104 is not forced to rotate with the brake cylinder shaft 64.

As illustrated in FIG. 3, a coil compression spring 120 is located around the portion 112 of the brake cylinder shaft 64 within the brake cylinder tube 80 between the cylindrical portion 96 of the end cap 94 and the adjacent steel disc 103. This spring 120 puts pressure on the disc 103 and the alternating steel discs 102 and the plastic discs 104. As illustrated in FIG. 3, the brake cylinder shaft 64 has a right hand threaded portion 122 that is located adjacent to the end cap 94. The brake adjusting mechanism 62 comprises the threaded portion 122 of the brake cylinder shaft 64 and a jam nut 123 that is threaded on a portion of the threaded portion 122 and the jam nut 123 is located immediately adjacent to the enlarged portion 98 of the end cap 94. In view of this arrangement, when the jam nut 123 is turned in a clockwise direction it presses against the enlarged portion 98 of the end cap 94 and this in turn exerts a force on the spring 120 that in turn puts pressure, represented by the arrow and the letter P, on the steel disc 103 and the alternating steel discs 102 and plastic discs 104.

As a result of this pressure P, the outer surface 125 of the plastic disc 104 that is located adjacent to the inner surface 127 of the brake cylinder end cap 84 is pressed against the inner surface 127 of the brake cylinder and cap 84 and is in frictional engagement with the inner surface 127. Also, as a result of this pressure P, the opposite surface 129 of the same plastic disc 104 is in frictional contact with the adjacent surface 131 of the adjacently located steel disc 102. As indicated previously, the steel discs 102 have projections 108 that fit into the adjacent channel 110 in the brake cylinder shaft 64 and hence the steel discs 102 rotate with the brake cylinder shaft 64. In view of this arrangement, the plastic disc 104 with its surfaces 125 and 129 that are in frictional engagement with the respective surfaces 127 and 131 create a frictional braking force that tends to resist the rotation of the steel disc 104 with the surface 131 and the associated rotation of the connected brake cylinder shaft 64. As illustrated in FIG. 1, when the brake wheels 66 and 68 that are non-rotatably fixed to the brake cylinder shaft 64 by the pins 65 are in contact with the respective wheels 20 and 22 this frictional braking force is transmitted to wheels 20 and 22 to resist movement of the wheeled surface abrading machine 10 due to the rotating abrading element 15 and its contact with the surface 16 that is being abraded.

The force BF illustrated in FIG. 1 that the wheels 66 and 68 exert on the wheels 20 and 22 can be increased or decreased by the operator by adjusting the jam nut 123 illustrated in FIG. 3. This jam nut 123 can be appropriately turned or adjusted to compensate for variations in the force F caused by variations in the surface 16 and different abrading tools 15. The jam nut 123 can also be adjusted by the operator to compensate for wear on the plastic disc 103 surfaces 125 and 129 or the adjacent steel disc 104 or when new metal and plastic discs 102, 103 and 104 are installed.

The plastic discs 104 that do not have the outer surface 125 located adjacent to the inner surface 127 of the brake cylinder end cap 84 are not subject to wear during the braking process and hence these plastic discs 104 can be used for spares for the plastic discs 104 that has its outer surface 125 located in contact with the inner surface 127 of the brake cylinder end cap 84 when it wears out. When this occurs, one of the plastic discs 104 that has not been subject to wear can be switched with the worn out plastic disc 104. This is accomplished by removing the jam nut 123, the brake cylinder end cap 94, the spring 120, plus the adjacent brake wheel 68 and the associated bearing assembly 72 in a conventional manner. Then, one of the plastic discs 104 that have not been subject to wear is switched with the worn out plastic disc 104 and the parts are reassembled in reverse order. To accomplish this, the discs 103, 102 and 104 are slipped off of the end of the brake cylinder shaft that had the brake wheel on it. This is made possible since the diameter of the respective holes 105, 106 and 118 in the steel disc 103, the steel discs 102 and the plastic discs 104 are slightly larger then the diameter of the threaded portion 122 of the brake cylinder shaft 64 and this permits the discs 103, 102 and 104 to be slipped over the threaded portion 122 of the brake cylinder shaft 64 once the jam nut is removed from the shaft 64.

As illustrated in FIG. 1, the brake wheels 66 and 68 are usually pressed into engagement with the respective surface abrading machine wheels 20 and 22 as a result of the pressure exerting means comprising the adjusting bolt 130 with its head and washer 132 and the threaded portion 134 with a portion that is threaded into the threaded hole 136 in the wheel mount 18. The pressure exerting means also includes a compression coil spring 138 that is located around a portion of the threaded portion 134 of the adjusting bolt 130 and the lower end of the compression spring 138 is in contact with the brake mounting plate 32 and forces it in a downward direction that results in the brake wheels 66 and 68 being pressed against the wheels 20 and 22. The distance D of the axis of rotation of the brake wheels 66 and 68 and the axis of rotation of the wheels 20 and 22 of the abrading machine 10 can be adjusted by turning the adjusting bolt 130 clockwise to narrow the distance and counter clockwise to increase the distance D. This adjusting bolt 130 permits compensation for a number of factors including wear of the abrading machine wheels 20 and 22 or the brake wheels 66 and 68.

As illustrated in FIG. 1, a brake release mechanism is provided that is designated generally by the number 142. This brake release mechanism 142 comprises a brake release handle 144 and a brake retaining bracket 146. The brake retaining bracket 146 comprises an L shaped cross section member with a flat substantially vertically oriented side 148 that fits up against the inside surface 150 of the upper portion 152 of the control arm 28 and is attached to the inside surface 150 by conventional means such as by self tapping bolts or the like that are not shown. The brake retaining bracket 146 also has the flat substantially horizontally located brake handle retaining plate 154 that has a substantially circular shaped hole 156 that is sized and shape to permit the passage of the upper portion of a brake release handle 144 that comprises basically an elongated rod. The brake release handle 144 has a manual gripping handle portion 162 that extends towards the rear of the abrading machine 10 and is located to be within easy reach of the hand of the operator of the abrading machine 10. A thin slot 164 is located in the brake handle retaining plate 154 and this slot 164 intersects the hole 156 in the brake handle retaining plate 154. The slot 164 is sized and shaped to receive a reduced diameter portion 166 located on the upper portion 168 of the brake handle 144.

The lower end portion of the brake handle 144 is rotatably mounted in a conventional manner on a shaft 172 that projects from the adjacent portion 36 of the mounting plate 32 by an enlarged loop 174 located on the lower end of the brake handle 144 that surrounds a portion of the shaft 172. In view of this arrangement, when the manual handle portion 162 of the brake handle 144 is pulled upward by the operator this causes the connected mounting plate 32 to pivot upward which also causes the brake wheels 66 and 68 to be pulled away from the wheels 20 and 22 of the abrading machine 10 and as a consequence, no braking force BF is applied to the wheels 20 and 22. The operator can lock the brake handle 144 in this upward position by pulling rearward or toward the rear of the abrading machine 10 on the manual handle portion 162 to cause the reduced diameter portion 166 located on the upper portion 168 of the brake handle 144 to slide into the slot 164 in the brake handle retaining plate 154 of the brake retaining bracket 146. This prevents the handle 144 from moving downward until the operator pushes forward on the manual handle portion 162 to cause the reduced diameter portion 166 to be removed from the slot 164 since while the reduced diameter portion 166 is in the slot 164 the larger portion of the brake handle 144 located adjacent to the the reduced diameter portion 166 contacts the upper surface 173 of the brake handle retaining plate 154 and prevents downward movement of the brake handle 144.

Also as indicated in FIG. 1, the braking system for a wheeled surface abrading machine 30 has means for rapidly replacing or repairing the main parts for the braking system 30 that are subject to wear comprising the indentations 180 and 182 in the respective end portions 34 and 36 of the mounting plate 32. These indentations 180 and 182 permit the easy removal of the brake assembly 58 including the brake cylinder assembly 60 and associated brake cylinder mounting plate 76, the brake adjusting mechanism 62, the brake cylinder shaft 64 and the brake wheels 66 and 68 as well as the bearing assemblies 70 and 72 from the brake mounting plate 32 without disassembling these parts by merely removing the bolts 74 and 78. Then the plastic disc 104 or discs 104 in the brake cylinder assembly 60 that has or have been subject to wear can easily be replaced as can the bearing assemblies 70 and 72, or any other parts associated with the brake cylinder assembly 60, or if desired, the complete brake assembly 58 can be replaced with or without new bearing assemblies 70 and 72. This feature allows the surface abrading machine to be in full operation to the maximum extent possible since repair and parts replacement time is minimized.

The braking system invention for a wheeled surface abrading machine 30 is manufactured from conventional readily available materials known in the art. The braking system for a wheeled surface abrading machine 30 is also manufactured using standard cutting, drilling and welding equipment that is well known in the art using standard construction techniques. The braking system invention for a wheeled surface abrading machine 30 may be manufactured as part of a wheeled surface abrading machine 10 at the time the wheeled surface abrading machine 10 is manufactured or the braking system for a wheeled surface abrading machine 30 may be used to retrofit an existing wheeled surface abrading machine 10.

In order to retrofit an existing wheeled surface abrading machine 10, suitable holes are drilled in the in the lower portions 42 and 44 of the control arms 26 and 28 for the bolts 46 and 48. Then, the upward extending end portions 34 and 36 of the mounting plate 32 and all the structure of the braking system 30 connected to the the mounting plate 32 is pivotally connected to the lower portions 42 and 44 of the control arms 26 and 28 of the existing wheeled surface abrading machine 10 by the bolts 46 and 48. A suitable threaded hole 136 is formed in the wheel mount 18 and the threaded portion 134 of an adjusting bolt 130 is inserted into the hole 136 after a compression coil spring 138 is located around the adjusting bolt 130. The brake retaining bracket 146 is also secured to the inside upper surface 150 of the upper portion 152 of the control arm 28 in the previously indicated manner. Then the brake release handle 144 is passed through the hole 156 in the brake handle retaining plate 154 and its lower end enlarged loop 174 is suitably located around a portion of the shaft 172 that projects from the portion 36 of the mounting plate 32. This completes the retrofit of the existing wheeled surface abrading machine 10 with the braking system for a wheeled surface abrading machine 30.

In order to use the braking system invention for a wheeled surface abrading machine 30, the wheeled surface abrading machine 10 is operated by the operator in a conventional manner. However, when undue or excessive forward forces F are encountered due to the action of the rotating abrading element 15 with the surface 16 being abraded, the braking system for a wheeled surface abrading machine invention 30 is put into operation. This is accomplished by the operator manually grabbing the manual gripping handle portion 162 of the brake release handle 144 and pushing forward toward the front of the wheeled surface abrading machine 10. This causes the reduced diameter portion 166 in the upper portion 168 of the brake handle 144 to move forward in the slot 164 of the flat surface brake handle retaining plate 154 of the bracket 146 until the reduced diameter portion 166 reaches the hole 156. When the reduced diameter portion 166 reaches the hole 156, the reduced diameter portion 166 is free of the slot 164 and the brake handle 144 is free to move up or down in the hole 156 since the handle 144 is no longer restrained by the surface 173 adjacent to slot 164 in the brake handle retaining plate 154 of the bracket 146. The handle 144 then moves downward or toward the bottom of the surface abrading machine 10 since it is connected to the brake mounting plate 32 that is biased downward or toward the bottom of the abrading machine 10 by the compression spring 138. When the brake mounting plate 32 moves downward, it results in the brake wheels 66 and 68 being pressed against the wheels 20 and 22 where they apply a braking force BF.

When a braking force BF is no longer required, the operator manually grabs the manual gripping handle portion 162 of the brake release handle 144 and pulls it in an upward direction until the reduced diameter portion 166 of the brake release handle 144 is located opposite the slot 164 in the bracket 146. Then, the operator pulls the manual gripping handle portion 162 toward the rear of the abrading machine 10 to cause the reduced diameter portion 166 to enter the slot 164. This results in the brake release handle 144 being locked in place in the slot 164 and this locks the brake mounting plate and the connected brake wheels 66 and 68 in place away from the wheels 20 and 22 of the surface abrading machine 10 so that no braking force BF is applied to the wheels 20 and 22. The operator repeats this process each time the undesired forward forces F are encountered.

Although the invention has been described in considerable detail with reference to a certain preferred embodiment, it will be understood that variations or modifications may be made within the spirit and scope of the invention as defined in the appended claims.

What is claimed is:

1. A braking system for a surface abrading machine for abrading a surface with an abrading element having a frame, an axle member and wheels comprising: braking means operatively connected to the frame to counteract force caused by contact of the abrading element with the surface being abraded and positioned to contact at least one of the wheels of the surface abrading machine including rotating means for rotatably engaging at least one of the wheels of the surface abrading machine and a braking means axle member connected to the rotating means and means for exerting a braking force through the braking means axle member, and manually operable brake engaging means for causing the rotating means of the braking means to engage at least one of the wheels of the surface abrading machine.

2. The braking system of claim 1 wherein the manually operable brake engaging means includes pressure exerting means for causing the rotating means to put pressure on at least one of the wheels of the surface abrading machine.

3. The braking system of claim 2 wherein the pressure exerting means includes adjusting means for adjusting the pressure put on at least one of the wheels of the surface abrading machine by the rotating means.

4. The braking system of claim 1 wherein the braking means axle member is separate from any axle associated with the wheels of the surface abrading machine.

5. The braking system of claim 4 wherein the separate braking means axle member is movable to an engaged position and a disengaged position.

6. The braking system of claim 5 wherein the separate braking means axle member is movable to an engaged position and a disengaged position by the manually operable brake engaging means.

7. The braking system of claim 1 wherein the means for exerting a braking force through the braking means axle member comprises at least one brake disc.

8. The braking system of claim 1 wherein the means for exerting a braking force through the braking means axle member comprises a plurality of brake discs.

9. The braking system of claim 8 further comprising means for putting pressure on the plurality of brake discs.

10. The braking system of claim 9 wherein the means for putting pressure on the plurality of brake discs comprises a spring.

11. The braking system of claim 9 wherein the plurality of brake discs include alternating metallic and nonmetallic brake discs.

12. The braking system of claim 11 wherein the braking means axle member rotates and the metallic brake discs are connected to and rotate with the braking means axle member.

13. A braking system for a surface abrading machine for abrading a surface with an abrading element having a frame, an axle member and wheels comprising: braking means operatively connected to the frame to counteract force caused by contact of the abrading element with the surface being abraded and positioned to contact at least one of the wheels of the surface abrading machine including rotating means for rotatably engaging at least one of the wheels of the surface abrading machine and a braking means axle member connected to the rotating means and means for exerting a braking force through the braking means axle member, brake force adjusting means associated with the means for exerting a braking force through the braking means axle member, and manually operable brake engaging means for causing the rotating means of the braking means to engage at least one of the wheels of the surface abrading machine.

14. The braking system of claim 13 wherein the brake force adjusting means comprises an adjustable rotatable member.

15. The braking system of claim 14 wherein the adjustable rotatable member comprises a nut.

* * * * *